March 18, 1952     N. F. BROWN     2,589,332
RESILIENT SEALING MEMBER FOR PISTONS, PLUNGERS OR THE LIKE
Filed April 21, 1949     3 Sheets-Sheet 1
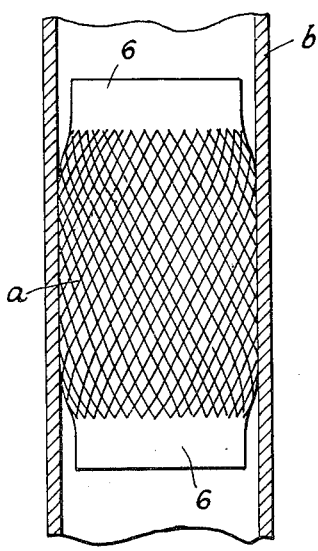
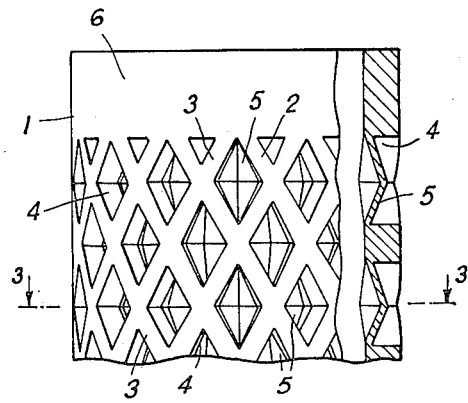
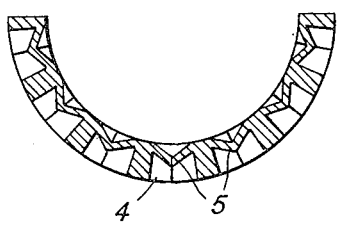
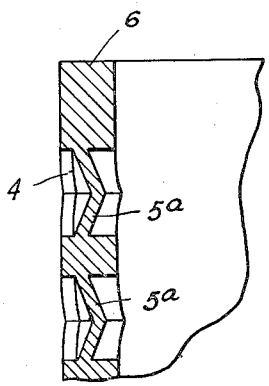
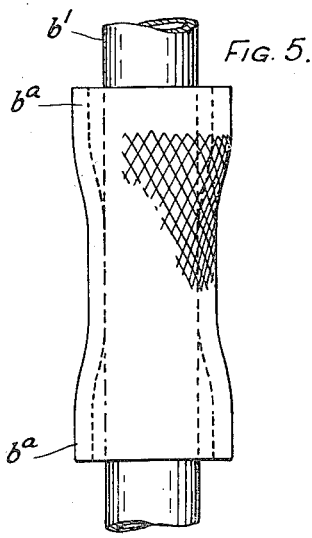
INVENTOR
NORMAN F. BROWN March 18, 1952          N. F. BROWN          2,589,332
RESILIENT SEALING MEMBER FOR PISTONS, PLUNGERS OR THE LIKE
Filed April 21, 1949          3 Sheets-Sheet 2
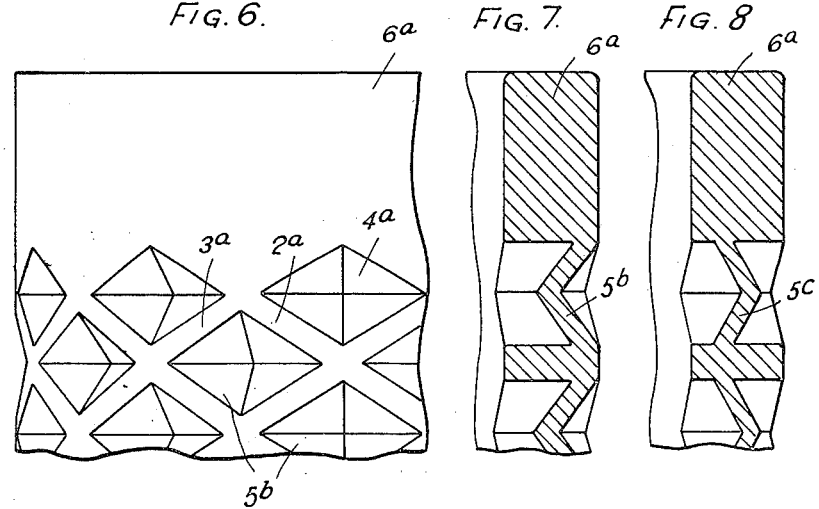
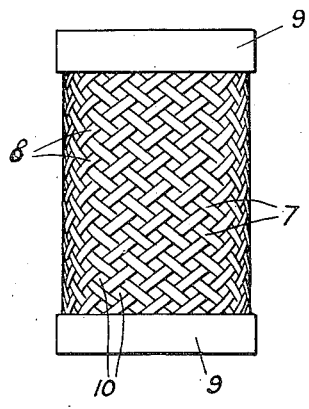
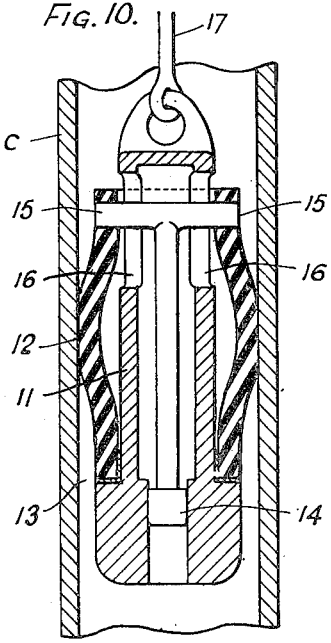
INVENTOR
NORMAN F BROWN March 18, 1952 N. F. BROWN 2,589,332
RESILIENT SEALING MEMBER FOR PISTONS, PLUNGERS OR THE LIKE
Filed April 21, 1949 3 Sheets-Sheet 3
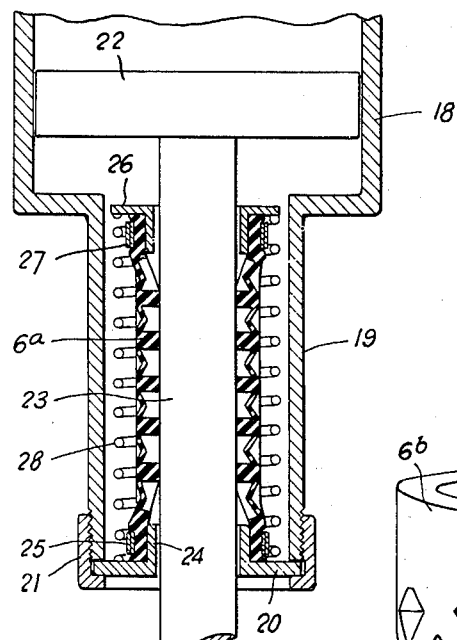
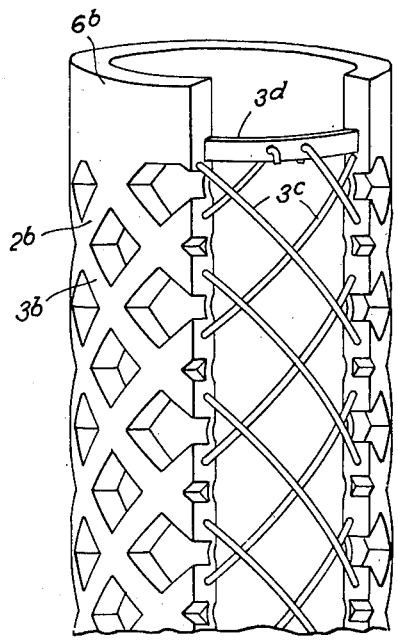
INVENTOR
N. F. BROWN
By Wilkinson & Mawhinney
ATTYS.

Patented Mar. 18, 1952

2,589,332

UNITED STATES PATENT OFFICE 2,589,332

RESILIENT SEALING MEMBER FOR PISTONS, PLUNGERS, OR THE LIKE

Norman Fraser Brown, Surrey, England, assignor to N. F. B. Displacement Pump Co. Limited, London, England Application April 21, 1949, Serial No. 88,796
In Great Britain February 13, 1947

17 Claims. (Cl. 309—23)

This invention relates to an improved resilient sealing member for pistons, plungers or the like and it is an object of the invention to provide a sealing member which may be compressed axially to make sealing engagement with the cylinder or the like in or over which it is to reciprocate.

According to the present invention a sealing member adapted for making sliding engagement with the cylindrical surface of a pipe, rod or the like includes a substantially cylindrical wall portion formed by right and left hand helically disposed ribs or strips the ends of which are respectively connected to axially spaced opposite end portions of the wall, the ribs or strips being free or resiliently connected at their points of intersection and spaced to provide a series of cells or recesses arranged to form a honeycomb or lattice-like pattern over the cylindrical wall portion, resilient means being provided closing one end of the cells and the arrangement being such that the effective diameter of the medial portion of the wall is respectively increased or decreased to make sliding sealing engagement with the pipe, rod or the like, by respectively compressing or stretching the sleeve in the direction of its longitudinal axis.

To enable the invention to be fully understood it will now be described with reference to the accompanying drawings, in which—

Fig. 1 is a diagrammatic view illustrating one embodiment of the invention;

Fig. 2 is a fragmentary view, partly in section, of a sealing member according to one embodiment of the invention;

Fig. 3 is a section on line 3—3 of Fig. 2, and

Fig. 4 is a fragmentary longitudinal section of a modified form of sleeve;

Fig. 5 is a diagrammatic view of a modified embodiment of the invention;

Figure 5a is a vertical longitudinal sectional view of the sleeve shown in Figure 5 as applied to a piston rod;

Fig. 6 is a fragmentary elevation of a modified form of sealing member shown diagrammatically in Fig. 5, and Fig. 7 is a fragmentary longitudinal section of the sleeve shown in Fig. 6, and Fig. 8 is a similar view to Fig. 7 but showing a modified form of sleeve;

Fig. 9 is an elevation of a still further modification of the invention,

Fig. 10 shows a sleeve mounted on an oil well swab, and

Fig. 11 is a view partly in section of a still further modification.

In Figs. 1 to 4 of the accompanying drawings there is illustrated a sealing member adapted to make sliding sealing engagement with the inner cylindrical surface of the pipe or cylinder. The normal external diameter of the sealing member is substantially less than the internal diameter of the pipe or the like in which it is to slide and as shown diagrammatically in Fig. 1 the sealing member $a$ is designed to permit it being expanded radially outwards to make sliding sealing engagement with the inner cylindrical wall of the pipe $b$.

As shown in Figs. 2 and 3 the sealing member is formed of natural or artificial rubber or like resilient material which is moulded to form a substantially cylindrical sleeve 1 the outer surface of which has a series of intersecting webs 2, 3 extending respectively in right and left hand helical paths. The webs are spaced apart to form the walls of diamond shaped cells or recesses 4 which are arranged over the medial portion of the outer surface of the sleeve to form a honeycomb or lattice-like pattern. Each cell has its major axis extending parallel to the longitudinal axis of the sleeve and its inner end is closed by a pyramidal shaped base 5 integral with the webs 2 and 3. The wall portions of the pyramids are relatively thin and as shown in Figs. 2 and 3 the apices are directed towards the outer surface of the sleeve to prevent inversion of the pyramid as a result of fluid pressure exerted on the inner surface of the sleeve. The opposite ends of the sleeve comprise annular portions 6 (one only being shown) which are adapted to be secured by suitable means to a piston, or other device by means of which the sleeve is reciprocated in the pipe $b$.

A modified form of sleeve is shown in section in Fig. 4. In this modification the outer surface of the sleeve is formed with the honeycomb pattern on similar lines to Figs. 2 and 3 but is particularly adapted for use wherein the outer surface of the sleeve will be subjected to a greater fluid pressure than the inner surface. Under such conditions the pyramidal base portions shown in Figs. 2 and 3 would tend to become inverted and accordingly to prevent this the apices of the pyramidal bases 5a of the cells are directed towards the inner surface of the sleeve. Further, the bases 5a of Fig. 4 instead of being located at the end of the cells are disposed adjacent to the middle of the webs.

When the sleeve is in its normal condition it will assume the substantially cylindrical shape shown in Fig. 2 and have an outer diameter substantially less than the inner diameter of the pipe or cylinder in which it is adapted to be reciprocated. If, however, the sleeve is compressed axially by pressure applied to its ends, the webs 2 and 3 defining the cells, being resilient, will bend whereby the shape of the cells 4 will be distorted so that the original major axes will be shortened and the original minor axes lengthened, with the result that the diameter of the medial portion of the sleeve is expanded radially outwardly as indicated diagrammatically in Fig. 1 to make sliding sealing engagement with the inner surface of the pipe or cylinder.

Any suitable means may be provided for axially compressing the sleeve, for example means may be provided on the piston or rod to which the sleeve is adapted to be secured, the means being mechanically adjusted to provide the desired axial compression of the sleeve. If desired, the sleeve may be axially compressed to make sealing engagement as the sleeve is reciprocated in one direction within the pipe, and the axial compressive force being relieved to permit the sleeve to return to its original diameter out of sealing engagement, during reciprocal movement in the opposite direction.

Any stresses due to the axial compression of the sleeve are taken up by the distortion of the webs 2, 3 and pyramidal members 5, 5a of the cells 4 and as these stresses are largely bending stresses, the sealing member may be rendered capable of withstanding repeated compressive forces without fear of fracture or breakage due to fatigue. The pyramids 5 or 5a being in tension will be readily distorted to permit the alteration in the shape of the recesses 4 when the sealing member is axially compressed.

A sealing member adapted to make sliding sealing engagement with the outer surface of a pipe or rod extending axially therethrough is illustrated in Figs. 5 to 8. In this embodiment the sealing member is adapted to form a gland packing and as shown comprises a sleeve 6a having an internal diameter which is normally greater than the external diameter of the pipe or rod $b^1$ over which it is adapted to slide. The sleeve is so arranged that when extended axially its medial portion is contracted radially inwards to such diameter that it makes sliding sealing engagement with the external cylindrical surface of the rod or pipe $b^1$.

As shown in Figure 5a, a cylinder 18 is provided having an extension 19 closed by an apertured plate 20 held in position by a screw cap 21. A piston 22 is located in the cylinder 18 and has a rod 23 which reciprocates in the extension 19 and projects through the apertured plate 20. A packing gland for the rod comprises a sleeve 6a which seats on the plate 20 and is supported by the annular flange 24 to which it is secured by suitable means 25. The upper end of the sleeve 6a is secured to a flanged annular disc 26 by securing means 27 and a coil spring 28 is provided surrounding the sleeve, the opposite ends of the spring abutting the plate 20 and disc 26 and tending to move them apart and thereby extend the sleeve 6a axially. The sleeve has a normal internal diameter greater than the external diameter of the rod 23 but when it is axially extended its medial portion is decreased so that it makes sliding sealing engagement with the rod 23. The sleeve may be used as a packing gland for sliding or rotating rods.

As shown more particularly in Figs. 6 and 7 the sealing member comprises a sleeve of resilient material which is moulded to provide a series of right and left hand helical webs 2a, 3a bounding diamond shaped cells or recesses 4a forming a honeycomb pattern similar to that described with reference to Fig. 2 except that, as the inner surface of the sleeve is to make sliding sealing engagement with the rod $b'$ cells are formed on the inner surface, instead of the outer surface of the sleeve. The ends of the cells 4a adjacent to the outer surface of the sleeve are closed by pyramidal shaped base portions 5b, the apices of which are directed inwardly as shown in Fig. 7 when the outer surface of the sleeve is likely, under working conditions, to be subjected to a greater fluid pressure than the inner surface. The modified sleeve shown in Fig. 8 is similar to that of Figs. 6 and 7 except that the apices of the pyramid 5c are directed towards the outer surface of the sleeve, this form being adapted for use under conditions wherein a greater fluid pressure is likely to be exerted against the inner face of the sleeve.

The sleeve according to Figs. 5 to 8 is adapted to slide over a pipe or rod such as indicated by $b^1$ which has an external diameter less than the normal internal diameter of the sleeve. When it is desired to make sliding sealing engagement, the sleeve is extended axially by suitable means adapted to apply force in opposite directions to the end portions 6a. As a result, the webs 2a 3a bounding the cells 4a will bend and the shape of the cells 4a will in consequence be distorted, whereby their original major axes will become shortened and their original minor axes lengthened resulting in a decrease in the diameter of the medial portion of the sleeve to make sliding sealing engagement with the outer surface of the pipe or rod $b^1$ as indicated in Fig. 5.

It will be understood that the sleeve may be secured to a piston, rod or other means for reciprocating it over the pipe or rod and mechanical or other means may be carried by the piston or the like for effecting the axial extension of the sleeve.

Although the cells have been described as of diamond shape, it will be understood that they may be elliptical, or any other suitable shape.

For example the sleeve may have cells of square, circular or like symmetrical shape wherein the diameter of the cell measured axially of the sleeve is substantially equal to its diameter measured at right angles to the sleeve axis. By applying axial force to compress or extend such a sleeve, its effective diameter could be increased radially outwardly or inwardly respectively for making sealing engagement with the inner surface of a pipe on the outer surface of a tube or rod.

It is, however, preferable to provide recesses having a major axis extending parallel to the axis of the sealing member where the sealing member is to be used for sealing engagement with a cylinder surrounding the member, as less force is required to compress the sealing member, to produce the desired increased diameter to make sealing engagement. For similar reasons it is preferred to provide recesses having a minor axis extending parallel to the long axis of the sealing member where the sealing member is to be used for sealing engagement with a rod or pipe extending axially through the sealing member.

A further modification of the invention is shown in Fig. 9, according to which the sleeve is formed by a series of round or flat metal wire or strips 7, 8 arranged as left and right hand helices respectively, the ends of the strips being secured to annular end portions 9. The strips may be interwoven to form a lattice-like pattern as shown in Fig. 9, the strips being spaced and defining a series of diamond-shaped openings 10. As in the previously described embodiments of the invention the effective diameter of the medial portion of the sleeve is adapted to be increased or decreased by force applied axially to the ends 9 and oppositely directed to compress or extend the sleeve. To provide a fluid seal, the outer or inner face of the sleeve may be covered by a continuous layer of rubber or like resilient material fixed to the ends 9.

According to the modification shown in Fig. 11 the intersecting webs 2b, 3b of the honeycomb sleeve are reinforced by stiffening wires 3c which are embedded in the webs. The object of the stiffening wires is to increase the resistance of the sleeve to endwise compression without materially affecting the ability of the sleeve to be expanded radially. As shown in Fig. 11 a ring 3d is provided at each end at which the ends of helically arranged wires 3c are anchored. These wires may be of round, square or other cross-section and if desired may be interlaced. The sleeve which is of rubber is moulded over the wires, the end rings 3d being embedded in the annular end plane portions 6b of the sleeve and the wires 3c are embedded in the webs 2b, 3b. The provision of stiffening wires is particularly advantageous if the sleeve is formed of relatively soft rubber material which may flex easily.

The sealing member according to the present invention is particularly adapted for use in oil well or other apparatus wherein a reciprocating piston or plunger is required to make sealing engagement with the inside of a pipe or the like only during its reciprocal movement in one direction, and is required on its return stroke to be out of sealing engagement. When used in such apparatus means are provided for applying axial force to the sealing member to provide the necessary seal for the desired stroke of the piston, the force being relieved at the beginning of the return stroke to allow the sealing member to revert to its original shape out of engagement with the wall of the pipe or the like. The sealing member is particularly adapted to use in the apparatus described in co-pending U. S. application No. 6,828 (filed February 7, 1948) now Patent 2,555,112.

Another important application of the invention is for providing a packing for "swabs" for extracting liquid from deep wells. To raise the liquid it is necessary that the plunger be lowered in the well through the liquid but be able to trap liquid above it as the plunger is raised.

In one form of swabbing plunger as shown in Fig. 10 the plunger comprises a hollow body 11 having an outer diameter substantially less than the inner diameter of the pipe C in which it is to operate. The sealing sleeve 12 may be similar in construction to those described by reference to any one of Figs. 1 to 4 or 9 except that in its normal or unstressed condition it is barrel-shaped as shown in Fig. 10. It is fitted round the outside of the body 11 of the plunger, and the lower end of its wall is secured at 13 to the lower end of the body. A piston member 14 is reciprocably mounted inside the plunger and provided with radial arms 15 extending through longitudinal slots 16 in the plunger body 11, the outer ends of the arms being secured to the upper end of the sleeve 12.

The plunger is lowered down the well piping on a line 17 and as it descends, the pressure acting on the underside of the piston 14 raises it, thereby extending the sleeve axially and effecting its reduction to its minimum diameter whereby it is maintained spaced inwardly of the walls of the pipe C so that fluids may flow easily upwards past the descending assembly. When the plunger is stopped, the piston 14 and packer 12 return to the position shown in Fig. 10. When it is raised up the pipe with liquid above it, the differential pressure on the opposite faces of the piston 14 causes the piston to be depressed relatively to the plunger thereby exerting an axial downward pressure on the sleeve to force the medial portion of the cylindrical wall to increase in diameter and make sealing engagement with the inner wall of the pipe C to enable the liquid above the plunger to be raised to the well surface by the line 17. In this construction, whilst the swab plunger is being raised up the pipe C the pressure above it acts on the inside of the packer 12 through the slots 16 as well as on the outside of the packer. The pressure outwards of the packer against the inside surface of the pipe is provided with the excess necessary to ensure a seal by the difference in pressure above and below acting on the area of the piston 14 which is designed appropriately.

If the sealing member is to be used in apparatus where the amount of compression or distention required is relatively small, the cells in the embodiment of Figs. 1 to 8 may be filled with a plastic or semi-plastic material capable of being distorted to adapt itself to any change in shape of the recesses. A suitable filling material may comprise a synthetic rubber composition impregnated with graphite or the like which will render the filling self-lubricating, to provide a desirable bearing surface for rubbing contact with the pipe or cylinder.

According to a modified form of the invention the sealing member is made of comparatively hard plastic or of metal as by die casting, its sealing surface being formed with recesses or cells as hereinbefore described to form a lattice or honeycomb pattern and the recesses are preferably filled with a plastic or semi-plastic lubricating material to produce a non-abrasive and self-lubricated surface. By providing such a sealing member with means such as a spring, adapted to exert an axial force to the opposite ends of the sealing member to compress or extend it axially, the diameter of the medial portion of the wall may be increased or decreased to urge the ribs bounding the recess to make sealing engagement with the wall of a cylinder surrounding the member or with a rod extending through the member. An important advantage of such an arrangement is that an effective sealing engagement is maintained due to the axial pressure continuously exerted by the spring in spite of any wear that takes place, as the bulging of the wall of the sealing member will be progressively increased to compensate for this wear.

I claim:

1. A sealing member adapted to make sliding sealing engagement with a cylindrical surface, said sealing member comprising a hollow cylindrical body the medial portion of which is formed by a series of intersecting ribs disposed in right and left hand helical relation and thin wall portions of resilient material extending between the ribs to bridge the hollow spaces formed between adjacent intersecting rib portions said ribs and said thin wall portions being so arranged that alteration in the normal axial length of the body by the application of an axially applied force will produce a variation of the angle of intersection of said ribs and a resultant alteration in the diameter of the said medial portion of the body to make sliding sealing engagement with the said cylindrical surface.

2. A sealing member adapted to make sliding sealing engagement with a cylindrical surface, said sealing member comprising a body formed of resilient mouldable material moulded to provide a series of right and left hand intersecting helical ribs forming a plurality of arch-like elements extending over the area of said body, and a thin diaphragm of resilient material extending between adjacent ribs to bridge the hollow spaces between the parts of said arch-like elements, the ribs and diaphragms being so arranged that an alteration in the normal axial length of said body will vary the normal span of said arch-like elements and produce a change in the diameter of said body to make sliding sealing engagement with the said cylindrical surface.

3. A sealing member adapted to be axially compressed to increase its diameter to make sliding sealing engagement with the inner surface of a tubular member inside which the said sealing member is adapted to reciprocate, said sealing member comprising a tubular body formed by a series of spaced right and left hand intersecting helical ribs, and thin wall portions of resilient material covering the spaces left between adjacent rib portions.

4. A tubular sealing member adapted to be axially compressed to increase its diameter to make sliding sealing engagement with the inner surface of a cylinder inside which the said sealing member is adapted to reciprocate, said sealing member comprising a plurality of right and left hand resilient helical ribs forming a series of arch-like elements extending over the outer surface of said body, and thin wall portions of resilient material closing the space between said arch-like elements whereby on axial compression of said sealing member the span of said arch-like elements is reduced resulting in an increase in their curvature and in the diameter of the sealing member being increased to make sliding sealing engagement with said cylinder.

5. A sealing member according to claim 4 wherein the said ribs and thin wall portions are formed integrally from a sleeve of resilient rubber.

6. A sealing member according to claim 5 wherein the said ribs are reinforced by metal strips embedded in the material of said ribs.

7. A sealing member according to claim 4 wherein the slope of the ribs at a point on the outer surface of the sealing member is less than 45° from a line parallel with the longitudinal axis of the sealing member.

8. A sealing member according to claim 4 wherein the said thin wall portions are shaped in the form of hollow pyramids.

9. A sealing member adapted to reciprocate over the outside of and make sliding sealing engagement with the outer surface of a cylinder, said sealing member comprising a tubular body having a normal inner diameter greater than the outer diameter of said cylinder, said body comprising a series of spaced resilient right and left hand helical intersecting ribs, and thin wall portions of resilient material covering the spaces left between adjacent rib portions, whereby on axial extension of said said tubular body the said right hand helical ribs are displaced relative to the said left hand ribs to produce a decrease in the diameter of the said tubular body to make sliding sealing engagement with said cylinder.

10. A tubular sealing member adapted to reciprocate over the outside of a cylinder and make sliding sealing engagement with the outer cylindrical surface thereof, said sealing member comprising a tubular body having a normal inner diameter greater than the outer diameter of said cylinder, said body comprising a series of spaced resilient right and left hand helical intersecting ribs constituting a series of arch-like elements extending over the inner surface of said body, and thin wall portions of resilient material closing the space formed between said arch-like elements whereby on axial extension of said tubular body the span of said arch-like elements is increased to produce a resultant decrease in their curvature whereby the diameter of the sealing member is decreased to make sliding sealing engagement with said cylinder.

11. A sealing member according to claim 10 wherein the said ribs and thin wall portions are formed integrally from a tubular sleeve of resilient rubber.

12. A sealing member according to claim 11 wherein the said thin wall portions are shaped in the form of hollow pyramids.

13. A sealing member according to claim 12 wherein the said ribs are reinforced by metal strips embedded in the material of said ribs.

14. A sealing member according to claim 13 wherein the slope of the ribs at a point on the outer surface of the sealing member is more than 45° from a line parallel with the longitudinal axis of the sealing member.

15. A radially expansible swab packer for use in oil well tubing comprising a tubular body of resilient material moulded to form a series of right and left hand helical ribs intersecting to define a series of diamond-shaped recesses, and a thin diaphragm moulded integrally with the ribs and extending therebetween to provide a base for each of said recesses.

16. A radially expansible swab packer adapted to be reciprocated in an oil well comprising a cylindrical sleeve of resilient material moulded to provide a series of right and left hand helical ribs intersecting to define a series of diamond-shaped recesses, said recesses having a radial depth at least ⅔ the radial distance between the inner and outer surfaces of said sleeve, and a thin integral diaphragm closing the inner end of each recess, the thickness of said diaphragm being less than ⅓ the depth of said recess.

17. A device adapted to make sliding sealing engagement with a cylindrical surface, said device comprising a cylindrical wall portion of resilient material moulded to form a series of right and left hand helical ribs defining a series of diamond-shaped cells, a plain annular portion at each end of said device to which the ends of said ribs are integrally connected, an annular metal reinforcement embedded in each plain annular portion, a reinforcing element embedded in each rib and connected at its ends to said annular metal reinforcements, and a thin diaphragm formed integrally with said ribs and forming a resilient base for said cells.

NORMAN FRASER BROWN.

REFERENCES CITED

The following references are of record in the file of this patent:

UNITED STATES PATENTS

| Number | Name | Date |
|---|---|---|
| D. 46,944 | Coughlin | Feb. 16, 1915 |
| 290,659 | Austin | Dec. 25, 1883 |
| 334,951 | Holt | Jan. 26, 1886 |
| 1,652,744 | Sorensen | Dec. 13, 1927 |
| 1,757,777 | Martin | May 6, 1930 |
| 2,393,496 | Stedman | Jan. 22, 1946 |

FOREIGN PATENTS

| Number | Country | Date |
|---|---|---|
| 221 | Great Britain | of 1888 |
| 828,983 | France | Mar. 7, 1938 |